July 10, 1962  J. N. COLEBROOK  3,043,172
MACHINE TOOL CONTROL
Filed May 11, 1959  2 Sheets-Sheet 1

INVENTOR
James N. Colebrook
BY
Synnestvedt Lechner
ATTORNEYS

July 10, 1962  J. N. COLEBROOK  3,043,172
MACHINE TOOL CONTROL
Filed May 11, 1959  2 Sheets-Sheet 2
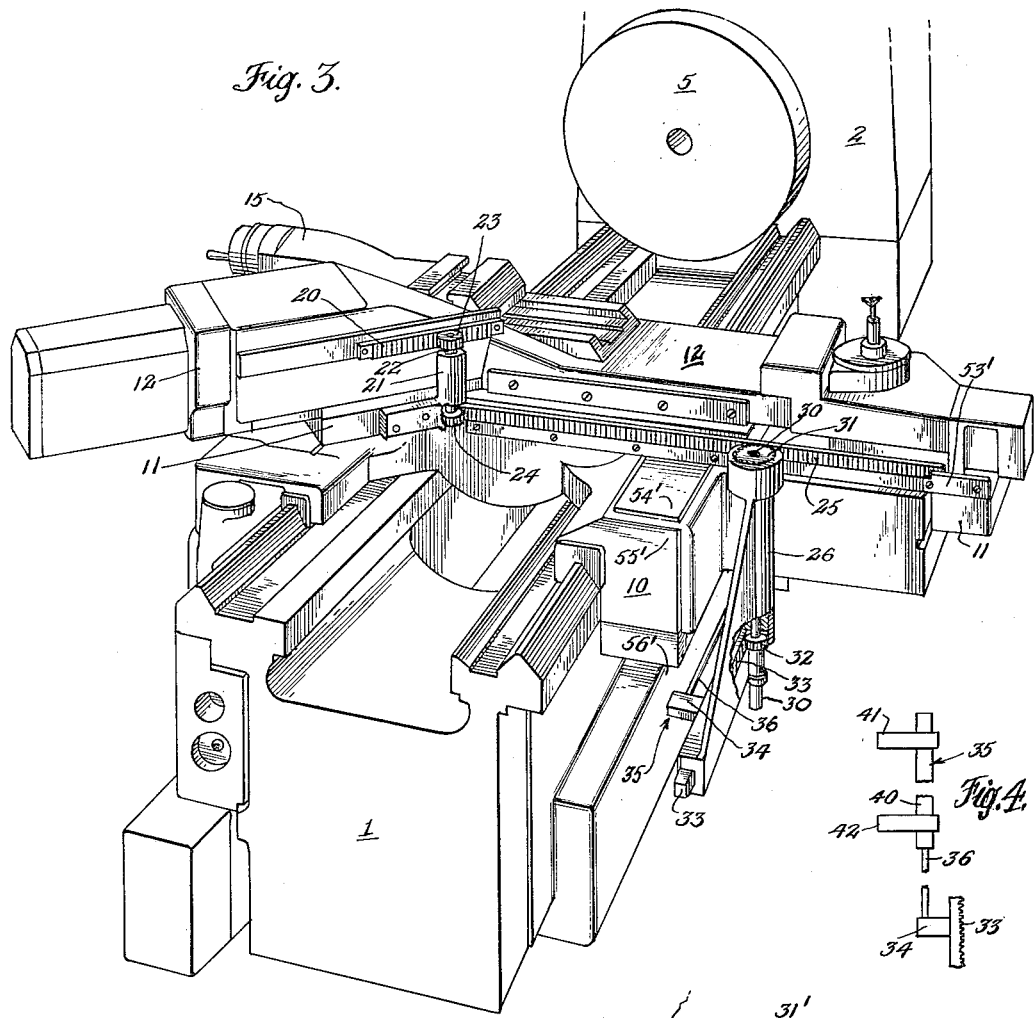
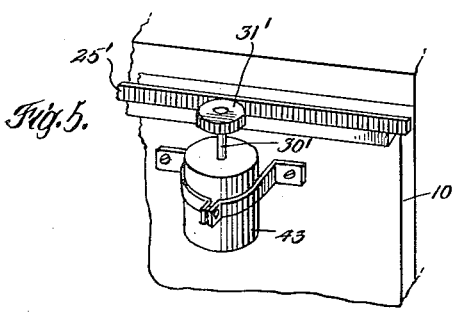
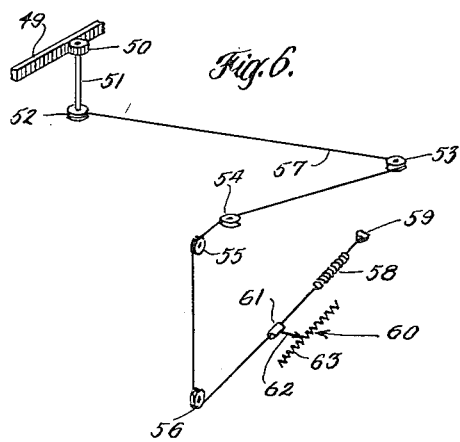
INVENTOR
James N. Colebrook
BY
Synnestvedt & Lechner
ATTORNEYS

United States Patent Office 3,043,172
Patented July 10, 1962

3,043,172
MACHINE TOOL CONTROL
James N. Colebrook, Cincinnati, Ohio, assignor to The Lodge & Shipley Company, Cincinnati, Ohio, a corporation of Ohio
Filed May 11, 1959, Ser. No. 812,541
9 Claims. (Cl. 82—2)

This invention relates to machine tools and in particular relates to means for use in maintaining constant the surface cutting speed.

In a turning or facing operation the actual cutting speed is the peripheral speed of the portion of the workpiece in contact with the cutting tool, and for a given rotational speed of the work, the cutting speed depends upon the actual radial position of the tool with respect to the rotational axis of the work. It is important that cutting speed be maintained within fairly narrow limits if maximum results are to be obtained from the standpoint of tool life, surface finish and maximum production.

In a turning or facing operation with constant workpiece speed, the actual cutting speed will vary as the tool progresses toward or away from the rotational axis of the workpiece. For example, where the tool moves from the periphery toward the axis, the actual cutting speed will be reduced and the result of this reduction of cutting speed is that the tool will not cut as fast as it is capable of cutting. This results in a loss of highly valuable production time. Accordingly, therefore, it is desirable in machine tools to control the workpiece speed so that the cutting speed remains at a constant optimum value.

For most of the commonly-used materials there have been established cutting speeds which are most effective for the cutting operation to produce the most satisfactory finish upon the surface, and therefore, it is desirable to maintain the ideal cutting speed in order to produce a smooth uniform cut and hence a finished surface which is free from objectionable tool marks. The advent of the modern high-speed cutting tools has given further emphasis to the problem of maintaining constant cutting speed because such tools operate most efficiently within rather narrow limits and the life of the tool may be substantially prolonged where such limits are maintained.

Broadly, the invention is concerned with apparatus operative in a turning or facing operation to sense the actual radial tool position to provide a means for use in controlling the workpiece speed so that the cutting speed remains constant for any radial position of the tool.

The invention has particular application to machine tools wherein the cutting tool is advanced to (or retracted from) the work at an acute angle to the rotational axis of the work. In this type of construction the tool is supported and moved by means of three slides disposed one upon the other. The first slide is capable of motion back and forth along the axis of the work; the second slide is mounted on the first slide for movement therewith and also for movement on the first slide at 90° to the axis of the work; and the tool or third slide is mounted on the second slide for movement therewith and also capable of motion on the slide at an acute angle to the axis of the work, preferably the angle is 45°. In a lathe construction, the first slide is commonly called a carriage, the second slide called a 90° cross slide and the tool slide is commonly called the 45° slide. Where such a structure is used for a turning operation, i.e., the workpiece is rotatably supported on centers between the headstock and tailstock, the carriage is moved along the bed usually at a uniform speed while the 45° slide is moved toward and away from the axis of the work usually under the control of a tracer mechanism. Where such a structure is used for a facing operation, the carriage is held fixed while the 90° slide is moved so that the tool advances from a point on the periphery of the workpiece toward the center, the 45° slide moving back and forth under the control of a tracer mechanism. In cross center facing, the rotational direction of the workpiece is reversed when the tool reaches the center and then the cross slide continues to move so that the tool moves from the center out toward the opposite peripheral point.

With such machines it will be apparent that the actual position of the tool depends upon the resultant motion of two moving slides. For example, in a turning operation the tool position is a function of the position of the carriage and the position of the 45° slide, and in a facing operation, is a function of the position of the 90° slide and the position of the 45° slide. In a typical contouring operation in turning, the tool may be required to remain at a fixed distance with respect to the axis of the workpiece (cutting a cylindrical part on the work) or to move at 90° to the axis (cutting a shoulder on the work) or move in or out at changing angles (cutting a curved part on the work). In a typical facing operation a similar tool path may be required.

From the foregoing it will be appreciated that with an acute angle slide construction, the problem of providing means for use in sensing the radial tool position which is automatically operative either for turning or facing becomes acute because in turning it is the position of the acute angle slide which determines the radial position of the tool, whereas in facing, either the 90° slide alone or both the 90° slide and the acute angle slide determine the radial tool position.

With the above in mind then, the present invention in one aspect contemplates apparatus for use in a machine tool having an acute angle slide which is operable both in turning and facing operations to sense the radial position of the tool and thereby provide a control means for use in controlling the drive for the workpiece so that the cutting speed remains constant for any radial tool position.

In another aspect the invention contemplates apparatus for use on a machine tool having an acute angle slide which is operative for both turning and facing to position a sensing member as a function of the radial location of the point of contact between the tool and the workpiece, the sensing member driving a device to develop a signal or voltage proportional to the radial tool position, the signal being for use in controlling the speed of the workpiece drive motor to maintain constant cutting speed.

In another aspect the invention contemplates apparatus for use on a machine tool of the kind in question which is operable both in turning and facing to sense the change in radial tool position due to the motion of the 90° slide and to sense the change in radial tool position due to the motion of the acute angle slide and algebraically add these changed positions and drive a signal generator as a function thereof, the signal of the generator being for use in controlling the drive of the workpiece so that the cutting speed remains constant for any radial tool position.

In another aspect the present invention contemplates relatively simple apparatus which is operatively interconnected between the three types of slides mentioned above and arranged to be responsive to the relative displacements of the slides either in turning or facing in a manner to sense any relative motion between the slides which effects a change in the radial position of the cutting tool and provides a means for control of the workpiece speed as a function of tool position so that cutting speed remains constant.

A preferred embodiment of the invention will be described below in connection with the accompanying drawings wherein:

FIGURE 3 is a perspective view of the lathe of FIGURE 1 with certain parts removed;

FIGURE 4 is a fragmentary diagrammatic view of the signal generator used in FIGURES 1–3;

FIGURE 5 is a fragmentary view illustrating an alternative form of signal generator; and FIGURE 6 is a diagrammatic view of an alternative arrangement of the invention.

Figure 1:
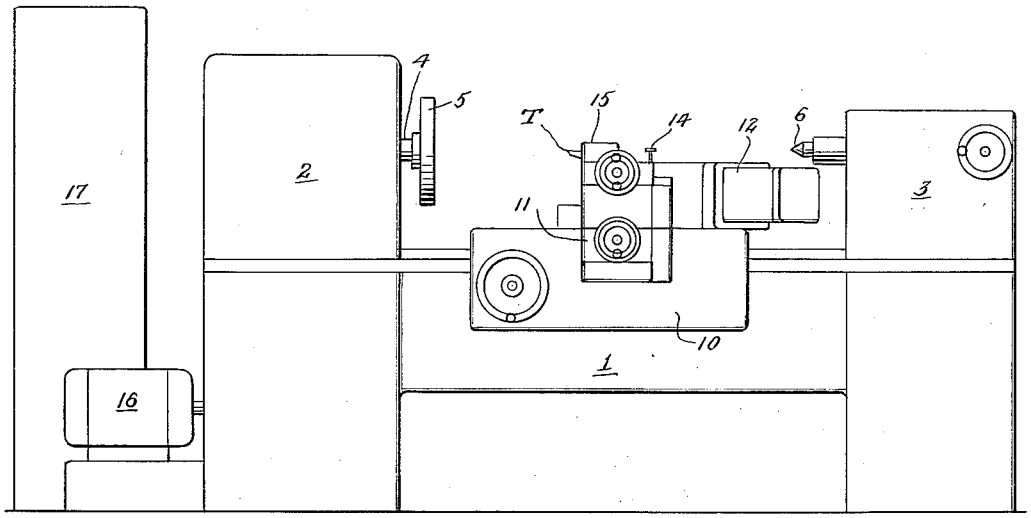
FIGURE 1 is a side elevational view of a typical lathe equipped with an acute angle tool slide.

In FIGURE 1 the lathe comprises a bed 1, having a headstock 2 and a tailstock 3. The headstock mounts a spindle 4 on which there is disposed chucking plate 5. The tailstock mounts a live center 6. On the bed there is a first slide or carriage 10 adapted to be moved back and forth along the bed or along the axis A of the spindle or workpiece. The carriage mounts a second or cross slide 11 movable therewith and which is arranged to be moved on the carriage at 90° to the axis A. On the 90° slide there is disposed an acute angle tool slide 12 movable with the 90° slide and which is arranged to be moved on the cross slide at an acute angle with respect to the axis A. In the present instance slide 12 is movable on the slide 11 at an acute angle of 45° as indicated. The ways 13 on the 90° slide are for guiding the tool slide along the 45° axis. The motion of the acute angle slide 12 is controlled by a tracer 14 cooperating with a tracer templet (not shown) fixed with respect to the bed. The tool slide 15 on the acute angle slide mounts the tool T.

The spindle 4 is adapted to be driven by an electric motor 16 the speed of which is controlled by the speed control device 17.

Figure 2:
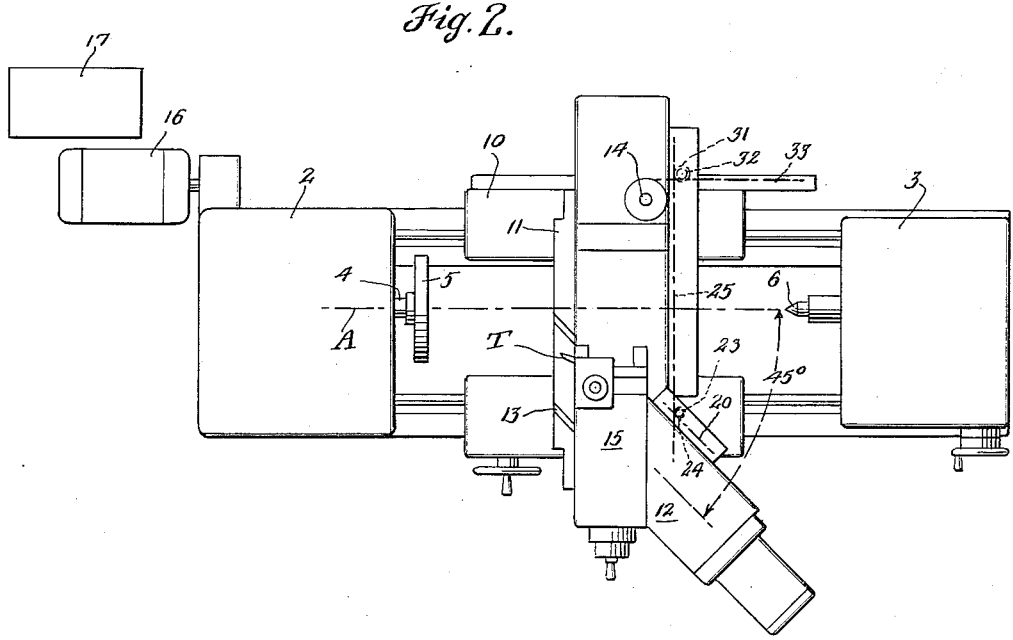
FIGURE 2 is a plan view of the lathe of FIGURE 1.

The headstock contains a plurality of gears which interconnect the spindle 4 and the motor 16. By appropriately interconnecting these gears the speed of the spindle may be changed for any given motor speed. The motor control 17 is used to energize the motor 16 and operates to vary the motor speed in accordance with a signal from my device so as to maintain constant cutting speed.

Where the machine of FIGURES 1 and 2 is used for turning, the carriage 10 is moved along the bed with the 90° slide 11 fixed with respect to the carriage, while the acute angle slide 12 moves back and forth along its axis under the control of the tracer mechanism. Where the apparatus is used for facing, the carriage is held fixed and the 90° slide 11 is moved to carry the tool toward and/or away from the axis of the work while the acute angle slide 12 moves back and forth under the control of the tracer 14 and a templet (not shown).

The above-mentioned components are all of standard construction, the function and operation of which are well understood by those skilled in the art and, therefore, no further details need be given.

The manner in which the invention is applied to the apparatus of FIGURES 1 and 2 will be explained in connection with FIGURES 3, 4 and 5.

The acute angle slide 12 has a rack 20 fixedly secured thereto and extending toward said axis at an angle the same as the slide 20 which in this case is 45°. The rack 20 moves in translation back and forth with the slide 12. The 90° slide 11 has a carrier 21 secured thereto. The carrier rotatably supports a shaft 22 which mounts a pinion 23 on its upper end and a pinion 24 on its lower end. The pinion 23 meshes with the rack 20 and it will be apparent that back and forth motion of the drive member or rack 20 will cause the pinion 23, shaft 22 and pinion 24 to rotate. The 90° slide 11 also carries a rack 25 which is in mesh with the pinion 24. The rack 25 is mounted on the slide 11 so that it is capable of back and forth movement in translation along a path at 90° to the workpiece axis and rotation of the pinion 24 causes the rack to move back or forth depending upon the direction of rotation of the pinion.

The carriage 10 supports a carrier or bracket 26 rotatably mounting a shaft 30 having a pinion 31 at one end and a pinion 32 at the other end. Back and forth movement of the rack 25 will cause rotation of the pinion 31, the shaft 30 and the pinion 32. On the bottom of the bracket 26 there is a rack 33 which is mounted for back and forth motion in the bracket along a path which is parallel to the workpiece axis. The rack 33 is in engagement with the pinion 32 and rotation of the pinion 32 will cause translatory movement of the rack. Secured to the rack 33 is an arm 34 which supports one end of an electrical signal generator 35.

It might be emphasized here that the rack 25 is mounted on the 90° slide 11 so that if the pinions 24 and 31 were disengaged, the rack would be moved back and forth with respect to the slide 11.

The signal generator 35 may take a variety of forms and preferably, in the arrangement shown, is of the telescoping type as diagrammatically illustrated in FIGURE 4, comprising a part 36 which is secured to the arm 34 and movable therewith and a part 40 which is secured to the carriage by the brackets 41 and 42. The part 36 moves inside of the part 40. Where the generator is of the resistance type, the part 36 carries the wiper and the part 40 carries the resistance winding. Where the generator is of the inductance type, the part 36 mounts the core or slug and the part 40 mounts the coils.

In FIGURE 5 I have shown another type of signal generator. The generator 43 is fixed to the carriage 10 and the pinion 31' and shaft 30' are driven by the rack 25'. The generator 43 is preferably of the resistance type, i.e., wherein the resistance wound as a helix and the wiper rotated for movement over the helix. The wiper is driven by the rotation of the shaft 30'.

The type of signal generators mentioned above are standard items, the details of construction and the function of which are well known to those skilled in the art and need not be explained in detail.

The manner in which the above structure operates will be explained following.

Assume that the carriage 10 and 90° slide are fixed and that the acute angle slide 12 is moved outwardly (or inwardly). This will cause a rotation of the pinions 23 and 24, movement of the rack 25, rotation of the pinions 31 and 32 and a movement of the rack 33 which will effect a movement of the wiper attached to the arm 36 of the signal generator 35. If the generator shown in FIGURE 5 is in use, the motion of the slide 12 will be transferred to the pinion 31' which will rotate the wiper.

In connection with the above movement, it is pointed out that the pinions 23 and 24 must have a special ratio depending upon the angle of the slide 12. In the present instance the slide 12 is oriented at an acute angle of 45° and, therefore, the ratio of the pinion 24 to the pinion 23 must be equal to the sine of the angle of 45°. For example, in one embodiment I have used a pinion 24 with 14 teeth and a pinion 23 with 20 teeth. It will be noted that this ratio is 0.7 which is somewhat less than the sine of 45°. For practical purposes, however, the ratio described is perfectly satisfactory and, therefore, the term "equal" should be interpreted as meaning equal within practical limits.

The reason for the ratio between the two pinions is so as to reflect the position of the tool as taken at 90° to the workpiece axis, i.e., the radial position of the tool. For example, if the slide 12 is moved out along the 45° axis, the tool will also be moved outwardly along the axis, but its radial movement or position will be the distance moved by the slide 12 multiplied by the sine of 45°. Thus, where the acute angle slide is moved, the rack 25 is moved a distance equal to the distance moved by the rack or drive member 20 multiplied by the sine of 45°.

Further, considering the operation of the above, assume that the carriage is fixed and that the acute angle slide 12 is non-movable on the 90° slide. If the 90° slide is then moved (left or right), the acute angle slide and tool correspondingly move and there is a change in radial position of the tool and the pinion 24, being carried by the 90° slide and in mesh with the rack 25, will cause the rack 25 to partake of the same movement as the slide 11 or tool. In this instance the pinion 24 does not rotate; it merely pushes the slide 25. The movement of the rack 25 causes operation of the signal generator as explained above.

If the 90° slide 11 and acute angle slide 12 are immovable with respect to the carriage and then the carriage is moved back and forth, this motion will have no effect on the signal generator 35. It is only when the rack 25 is moved that the signal generator is effected. The rack 25 then is a sensing device or member, i.e., it senses the radial position of the tool. For example, as explained above, if the acute angle slide 12 moves out, the pinion 24, hence the rack 25, are moved a distance corresponding to the actual radial movement of the tool. Also, if the 90° slide 11 is moved in or out, the rack 25 will correspondingly move and, therefore, sense the radial position of the tool.

The arrangement described is effective for causing the rack 25 to sense the position of the tool, even when there is simultaneous motion of the 90° slide 11 and acute angle slide 12. For example, suppose that the 90° slide is moved toward the axis A (left to right) while at the same time the acute angle slide is moved outwardly (toward the left). The pinion 24 moves in with the 90° slide and hence, as explained above, exerts a force on the rack to effect a corresponding inward movement; in other words, it provides a component of motion to the rack 25 which is toward the axis A. However, since the acute angle slide 12 is moving outwardly, the rack 20 is causing the pinion 24 to rotate and it exerts a force on the rack to provide a component of motion to the rack which is in the opposite direction to the component provided by the motion of the pinion 24. In other words, the pinion 24 is moving inwardly and rotating at the same time and effecting two opposite motion components on the rack 25 so that the motion of the rack 25 due to the 90° slide has subtracted therefrom the motion due to the radial displacement of the acute angle slide. This difference in direction of components on the rack 25 is permitted by virtue of the fact that the rack 25 is movable with respect to the 90° slide and the rack 25 moves inwardly at a slower speed than the 90° slide 11 (or is displaced over a smaller distance than the displacement of the 90° slide in the same amount of time). Thus, the change in radial tool position due to the motion of the 90° slide and the change in radial tool position due to the motion of the acute angle slide are algebraically added (subtracted on the motion) and the position of the rack represents the resultant or true radial position of the tool.

From the above it will be apparent that the arrangement provides for the rack 25 to sense the true radial position of the tool for other kinds of motion of the 90° and acute angle slides; for example, where both the 90° slide and acute angle slide are moving toward the axis where the two components are added and the rack 25 moves in faster than the 90° slide.

One very important advantage of the above is that it is operative for the 90° shoulders to be cut in a facing operation, i.e., where the tool path is parallel to the workpiece axis, and hence has no change in radial position. In this instance the 90° slide must move at a speed which is the same as the radial speed of the acute angle slide. In other words, the speed of the 90° slide must be the actual speed of the acute angle slide along its axis multiplied by the sine of the acute angle (conversely, the speed of the acute angle slide along its axis must be the same as the speed of the 90° slide divided by the sine of the acute angle). Since the radial speed of the acute angle slide is the same as the speed of the 90° slide, the two components on the rack 25 are equal and, therefore, the rack remains fixed in space. Therefore, there is no change in the signal of the generator and the motor driving the workpiece will remain at the speed attained when the shoulder cutting operation commenced.

The rack 25 may be made of a length to accommodate ordinary facing, i.e., where the tool moves between a peripheral point on the workpiece and the rotational axis or the rack may be of a length to accommodate cross center facing where the tool moves from a peripheral point on one side of the work to the center and then outwardly to an opposite peripheral point.

The signal generator may be of a type for either the usual facing or for cross center facing. In the latter case it is preferred that the generator have a center position which corresponds to the position of the tool when the same (the cutting tip) is coincident with the axis of rotation of the workpiece so that for a continuous pass of the tool across the face, the speed of the workpiece will gradually increase as the tool moves from one periphery to the center and then gradually decrease as the tool moves from center to the opposite periphery.

As is well known, there is a hyperbolic relationship between radial tool position and workpiece speed for the maintaining of constant cutting speed. The required hyperbolic function may be built into the signal generator itself or, alternatively, the function may be built into the motor control. The generator, therefore, may be linear or non-linear depending upon the type of control, although the linear type is preferred.

In FIGURE 6 I have diagrammatically illustrated another form of the invention and this will be explained following.

A rack 49 similar to the rack 20 is adapted to be secured to an acute angle slide such as the slide 12. A pinion 50 is in engagement with the rack 49, the pinion being mounted on a shaft 51 carrying a pulley 52, these elements all being disposed in a support similar to the support 21 mounted on a 90° cross slide such as slide 11. The pulley 52 and pinion 50 bear a ratio the same as the sine of the acute angle of the acute angle slide. Another pulley 53 is mounted on the 90° cross slide, for example, at a position 53′ as indicated in FIGURE 3. The three pulleys 54, 55 and 56 are mounted on the carriage, for example, in positions on carriage 11 indicated in FIGURE 3 by the numerals 54′, 55′ and 56′. As will be apparent these pulleys carry a cord element 57, one end of which is secured to the pulley 52 and several turns of the cord being wound around the pulley. The other end of the cord is secured to one end of a spring 58, the other end of which is fixed to the carriage as indicated at 59. The cord is used to drive a signal generator 60 as follows. The cord mounts a yoke 61 which carries a wiper arm 62 in engagement with the resistance element 63. As the cord 57 is moved, the wiper 62 moves over the resistance element fixed on the carriage. The spring 58 is preferably of the type which will exert a constant force on the cord 57.

The arrangement of FIGURE 6 operates substantially in the same manner as the arrangement of FIGURE 3. For example, if the carriage and 90° slide are held fixed and the acute angle slide is moved back or forth, the pinion 50 will be rotated which will cause rotation of the pulley 52. When the pulley 52 is rotated in one direction, the cord 57 will be moved against the force of the spring and if the pulley 52 is rotated in the opposite direction, the cord will be moved in the opposite direction powered by the force of the spring 58. The movement of the cord 57 effects a movement of the wiper arm 62 over the resistance element 63.

When the acute angle slide is held fixed with respect to the 90° slide and the 90° slide is moved toward or away from the center of the axis of the workpiece, the pulley 52 will be moved (but not rotated) to effect a corresponding movement of the cord 57.

Where the acute angle slide and the 90° slide are moved simultaneously, the pulley 52 acts in the same manner as the pinion 24 to impose on the cord 57 a component of motion due to the motion of the 90° slide and a component of motion due to the motion of the acute angle slide. The difference in direction of these components is compensated for by virtue of the fact that the cord 57 is movable with respect to the 90° slide and under the above conditions moves at a different speed than the 90° slide. The two components are algebraically added so that the position of a point on the cord represents the resultant or true radial position of the tool.

I claim:

1. In a machine tool having mechanism for mounting and for rotating a workpiece about an axis, a first slide mounted for movement along said axis, a second slide mounted on said first slide for movement therewith and for movement at 90° to said axis and a third slide adapted to carry a tool and mounted on said second slide for movement therewith and for movement at an acute angle to said axis, apparatus for use in maintaining a constant cutting speed on a workpiece comprising: a drive member mounted on said acute angle slide for movement in translation with movement of the slide; a sensing member mounted on said 90° slide for movement in translation; and connections between said drive member and said sensing member for moving the sensing member with movement of the drive member, the connections moving the sensing member a distance equal to the sine of the acute angle of said acute angle slide multiplied by the distance moved by the drive member.

2. In a machine tool having mechanism for mounting and for rotating a workpiece about an axis, a first slide mounted for movement along said axis, a second slide mounted on said first slide for movement therewith and for movement at 90° to said axis and a third slide adapted to carry a tool and mounted on said second slide for movement therewith and for movement at an acute angle to said axis, apparatus for use in maintaining a constant cutting speed on a workpiece comprising: a drive member mounted on said acute angle slide for movement in translation with movement of the slide; a sensing member mounted on said 90° slide for movement in translation; an electrical signal generator mounted on said first slide and interconnected with and operated by said sensing member, the signal being for use with said mechanism for controlling the speed of the workpiece; and means including said drive member to impart a component of motion to said sensing member when the 90° slide is moved and to impart a component of motion to the sensing member when the acute angle slide is moved, last said component being equal to the sine of the acute angle of said acute angle slide multiplied by the distance moved by the drive member.

3. In a machine tool having mechanism for mounting and for rotating a workpiece about an axis, a first slide mounted for movement along said axis, a second slide mounted on said first slide for movement therewith and for movement at 90° to said axis and a third slide adapted to carry a tool and mounted on said second slide for movement therewith and for movement at an acute angle to said axis, apparatus for use in maintaining a constant cutting speed on a workpiece comprising: a drive member mounted on said acute angle slide for movement in translation with movement of the slide; a sensing member mounted on said 90° slide for movement in translation; an electrical signal generator connected with said first slide, the signal thereof being for use with said mechanism for controlling the speed of said workpiece; and means including said sensing member and said drive member connected between said first slide and said acute angle slide and connected with said signal generator to impart a component of motion to the sensing member when the 90° slide is moved and to impart a component of motion to the sensing member when the acute angle slide is moved, last said component being equal to the sine of the acute angle of said acute angle slide multiplied by the distance moved by the drive member.

4. In a machine tool having mechanism for mounting and for rotating a workpiece about an axis, a first slide mounted for movement along said axis, a second slide mounted on said first slide for movement therewith and for movement at 90° to said axis, a third slide adapted to carry a tool and mounted on said second slide for movement therewith and for movement at an acute angle to said axis, apparatus for use in maintaining a constant cutting speed on a workpiece comprising: a first rack fixed to said acute angle slide and extending at the same acute angle to said axis, the rack being movable with the slide; a carrier mounted on said 90° slide and rotatably supporting a shaft carrying first and second pinions, the first pinion being in engagement with said first rack and the ratio of the second pinion to the first pinion being equal to the sine of said acute angle; a second rack mounted on said 90° slide for movement at 90° to said axis, the second rack being in engagement with said second pinion; a second carrier mounted on said first slide and rotatably mounting a shaft carrying third and fourth pinions, the third pinion being in engagement with said second rack; a third rack movably mounted on said first slide, the direction of motion of the rack being parallel to said axis and the third rack being in engagement with said fourth pinion; and an electrical signal generator mounted on said first slide and connected to and operated by said third rack, the signal being for use with said mechanism for controlling the speed of the workpiece.

5. In a machine tool having mechanism for mounting and for rotating a workpiece about an axis, a first slide mounted for movement along said axis, a second slide mounted on said first slide for movement therewith and for movement at 90° to said axis, a third slide adapted to carry a tool and mounted on said second slide for movement therewith and for movement at an acute angle to said axis, apparatus for use in maintaining a constant cutting speed on a workpiece comprising: a first rack fixed to said acute angle slide and extending at the same acute angle to said axis, the rack being movable with the slide; a carrier mounted on said 90° slide and rotatably supporting a shaft carrying first and second pinions, the first pinion being in engagement with said first rack and the ratio of the second pinion to the first pinion being equal to the sine of said acute angle; a second rack mounted on said 90° slide for movement at 90° to said axis, the second rack being in engagement with said second pinion; and an electrical signal generator mounted on said first slide and connected to and operated by said second rack, the signal being for use with said mechanism for controlling the speed of the workpiece.

6. In a machine tool having mechanism for mounting and for rotating a workpiece about an axis, a first slide mounted for movement along said axis, a second slide mounted on said first slide for motion at 90° to said axis, a third slide adapted to carry a tool and mounted on said second slide for movement therewith and for movement at an acute angle to said axis, apparatus for use in maintaining a constant cutting speed on a workpiece comprising: an electrical signal generator for developing a signal for use with said mechanism for controlling the speed of the workpiece; mechanism including rack and pinion means interconnected with said slides and connected to and driving said generator arranged so that: when the 90° slide and the acute angle slide element are moved toward or away from one another there is relative motion between the rack and pinion and said generator is driven; when the 90° slide and the acute angle slide move relatively away from each other with the speed of the 90° slide being equal to the speed of the acute angle slide multiplied by the sine of the acute angle of the acute angle slide, there is no relative motion between the rack and pinion and said generator is not driven; and when the acute angle slide moves toward or away from said axis with no movement of said 90° slide there is relative motion between the rack and pinion and the generator is driven.

7. In a machine tool having mechanism for mounting and for rotating a workpiece about an axis, a first slide mounted for movement in a direction along said axis, a second slide mounted on said first slide for movement therewith and for movement at 90° to said axis and a third slide adapted to carry a tool and mounted on said second slide for movement therewith and for movement at an acute angle to said axis, apparatus for use in maintaining a constant cutting speed on a workpiece comprising: generator means connected with one of said slides and operable to develop a signal for use with said mechanism for controlling the speed of the workpiece; a movable sensing member connected with one of said slides and connected to actuate said generator means; and means including connections with said sensing member and said acute angle slide for moving said sensing member, said means providing for motion of the sensing member with movement of said first slide but without actuating said generator means and moving the sensing member to actuate the generator means when said 90° slide moves and moving the sensing member to actuate the generator means when said acute angle slide moves, last said movement of the sensing member being equal to the sine of the acute angle of the acute angle slide multiplied by the distance moved by the acute angle slide.

8. In a machine tool having mechanism for mounting and for rotating a workpiece about an axis, a first slide mounted for movement in a direction along said axis, a second slide mounted on said first slide for movement therewith and for movement at 90° to said axis and a third slide adapted to carry a tool and mounted on said second slide for movement therewith and for movement at an acute angle to said axis, apparatus for use in maintaining a constant cutting speed on a workpiece comprising: generator means connected with one of said slides and operable to develop a signal for use with said mechanism for controlling the speed of the workpiece; a movable sensing member connected with one of said slides and connected to actuate said generator means; and means including connections with said sensing member and said acute angle slide for moving said sensing member, said means providing for motion of the sensing member with movement of said first slide without actuating said generator means and imparting a component of motion to the sensing member when said 90° slide is moved and imparting a component of motion to said sensing member when said acute angle slide is moved, last said component being equal to the sine of the acute angle of said acute angle slide multiplied by the distance moved by the acute angle slide.

9. In a machine tool having mechanism for mounting and for rotating a workpiece about an axis, a first slide mounted for movement in a direction along said axis, a second slide mounted on said first slide for movement therewith and for movement at 90° to said axis and a third slide adapted to carry a tool and mounted on said second slide for movement therewith and for movement at an acute angle to said axis, apparatus for use in maintaining a constant cutting speed on a workpiece comprising: generator means connected with one of said slides and operable to develop a signal for use with said mechanism for controlling the speed of the workpiece; means interconnected to said slides to sense the change in radial displacement of the tool due to motion of the 90° slide and to sense the change in radial displacement of the tool due to motion of the acute angle slide and to algebraically add said displacements; and connections between said means and said generator providing for the generator to be actuated by said means.

References Cited in the file of this patent
UNITED STATES PATENTS

| | | |
|---|---|---|
| 1,217,823 | Powell | Feb. 27, 1917 |
| 2,586,183 | Stewart | Feb. 19, 1952 |
| 2,716,369 | Mumma | Aug. 30, 1955 |